United States Patent
Burke et al.

(10) Patent No.: US 9,822,708 B2
(45) Date of Patent: Nov. 21, 2017

(54) IGNITER EVENT CONDUCTOR FOR CONDUCTING IGNITER EVENTS FROM A COMBUSTION CHAMBER TO A SENSOR

(71) Applicant: WOODWARD, INC., Fort Collins, CO (US)

(72) Inventors: Daniel S. Burke, Greer, SC (US); Jeffrey Taylor Stewart, Greeley, CO (US); Jim Causey, Greenville, SC (US); Michael Hackenberg, Piedmont, SC (US); Bruce Harrar, Easley, SC (US)

(73) Assignee: Woodward, Inc., Fort Collins, CO (US)

(*) Notice: Subject to any disclaimer, the term of this patent is extended or adjusted under 35 U.S.C. 154(b) by 370 days.

(21) Appl. No.: 14/270,842

(22) Filed: May 6, 2014

(65) Prior Publication Data

US 2015/0322863 A1    Nov. 12, 2015

(51) Int. Cl.
| | | |
|---|---|---|
| *G01M 15/14* | (2006.01) | |
| *F02C 7/264* | (2006.01) | |
| *F02C 7/266* | (2006.01) | |
| *F23N 5/08* | (2006.01) | |
| *F23N 5/12* | (2006.01) | |

(Continued)

(52) U.S. Cl.
CPC .............. *F02C 7/264* (2013.01); *F02C 7/266* (2013.01); *F23N 5/08* (2013.01); *F23N 5/12* (2013.01); *F23N 5/16* (2013.01); *F23N 5/245* (2013.01); *F05D 2240/35* (2013.01); *F05D 2260/80* (2013.01); *F05D 2260/83* (2013.01); *F05D 2260/99* (2013.01); *F05D 2270/30* (2013.01); *F05D 2270/80* (2013.01); *F05D 2270/804* (2013.01); *F23N 2029/14* (2013.01); *F23N 2029/20* (2013.01); *F23N 2031/06* (2013.01); *F23N 2031/12* (2013.01); *F23N 2041/20* (2013.01)

(58) Field of Classification Search
USPC ........................................................ 73/112.01
See application file for complete search history.

(56) References Cited

U.S. PATENT DOCUMENTS

| | | |
|---|---|---|
| 4,090,125 A | 5/1978 | Warner |
| 4,636,777 A | 1/1987 | Skerritt |

(Continued)

FOREIGN PATENT DOCUMENTS

EP     1564491     8/2005

OTHER PUBLICATIONS

International Search Report and Written Opinion of the Interantional Searching Authority issued in International Application No. PCT/US2015/029406 dated Jul. 6, 2015.

(Continued)

*Primary Examiner* — Eric S McCall
(74) *Attorney, Agent, or Firm* — Fish & Richardson P.C.

(57) ABSTRACT

A system for a gas turbine engine includes an igniter event conductor. The igniter event conductor has a first portion adjacent an igniter of the engine and in a combustion chamber of the engine and a second portion apart from the igniter and apart from the combustion chamber. The conductor is adapted to conduct an aspect of an igniter event at the igniter from the first portion to the second portion. A sensor is coupled to the second portion of the conductor to sense the aspect of the igniter event.

19 Claims, 4 Drawing Sheets

(51) Int. Cl.
*F23N 5/16* (2006.01)
*F23N 5/24* (2006.01)

(56) References Cited

U.S. PATENT DOCUMENTS

| | | | |
|---|---|---|---|
| 4,760,341 A | 7/1988 | Skerritt | |
| 5,499,497 A * | 3/1996 | DeFreitas | F02C 7/266 60/39.821 |
| 5,523,691 A | 6/1996 | Frus | |
| 6,487,899 B1 | 12/2002 | Wahl et al. | |
| 7,093,421 B2 | 8/2006 | Ponziani et al. | |
| 7,375,531 B2 | 5/2008 | Ponziani et al. | |
| 7,386,982 B2 | 6/2008 | Runkle et al. | |
| 7,546,741 B2 | 6/2009 | Sasao et al. | |
| 9,134,199 B2 * | 9/2015 | Hwang | G01M 15/14 |
| 2005/0172637 A1* | 8/2005 | Ponziani | F02C 7/266 60/776 |
| 2005/0174121 A1* | 8/2005 | Ponziani | F02C 7/266 324/402 |
| 2006/0137354 A1* | 6/2006 | Ponziani | F02C 7/266 60/772 |
| 2010/0117859 A1* | 5/2010 | Mitchell | F01D 17/02 340/870.16 |
| 2010/0186368 A1* | 7/2010 | Ikeda | F02C 7/264 60/39.821 |
| 2012/0110975 A1* | 5/2012 | Alholm | F02C 7/266 60/39.827 |
| 2014/0373609 A1* | 12/2014 | Hwang | G01M 15/14 73/112.01 |
| 2014/0376588 A1* | 12/2014 | Wang | G01J 5/0088 374/121 |
| 2014/0376589 A1* | 12/2014 | Karp | G01M 15/14 374/130 |
| 2014/0376590 A1* | 12/2014 | Hwang | G01M 15/14 374/130 |
| 2015/0027211 A1* | 1/2015 | Claussen | G01L 19/0663 73/112.01 |
| 2015/0260557 A1* | 9/2015 | DeSilva | G01M 15/14 702/48 |

OTHER PUBLICATIONS

PCT International Preliminary Report on Patentability, PCT/US2015/029406, dated Nov. 17, 2016, 8 pages.

* cited by examiner

IGNITER EVENT CONDUCTOR FOR CONDUCTING IGNITER EVENTS FROM A COMBUSTION CHAMBER TO A SENSOR

BACKGROUND

The following description relates to detecting igniter events in gas turbine engines.

Determining the cause of an ignition problem in an engine (e.g., misfire) can be costly and time-consuming. It can be difficult to determine in situ whether an ignition problem is due to a problem with the electrical ignition components or a problem with a system external to the igniter (e.g., the fuel delivery system). For example, an ignition system problem could be due to insufficient voltage being supplied to the igniter, or the spark forming at an improper location (e.g. not at the igniter tip). Also the lack of ignition could be caused by inadequate fuel/air conditions. Some methods of troubleshooting ignition problems involve costly extra equipment and removing the igniter from the engine to be tested separately.

BRIEF DESCRIPTION OF THE DRAWINGS

Like reference symbols in the various drawings indicate like elements.

DETAILED DESCRIPTION

The concepts herein relate to detecting successful igniter events of an igniter for a gas turbine engine.

Figure 1:
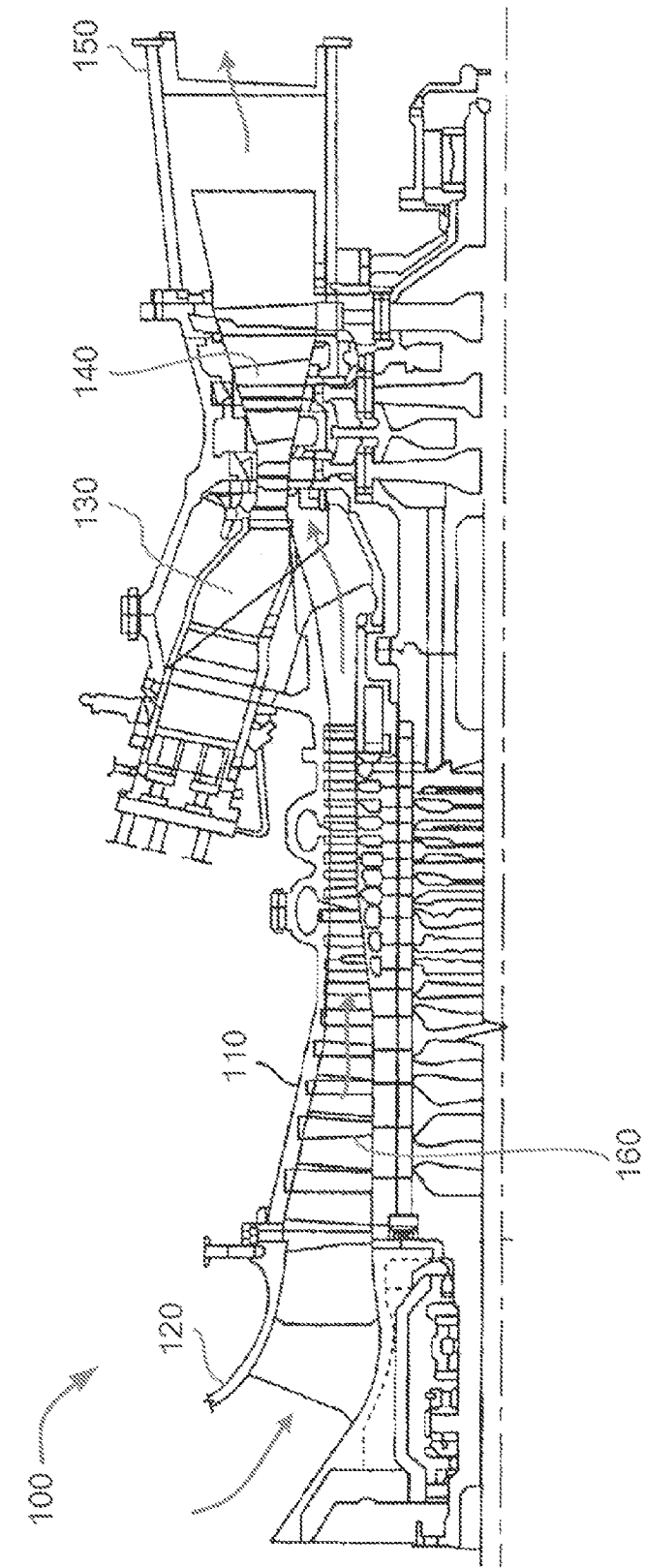
FIG. 1 is a half cross-sectional view of an example gas turbine engine.

FIG. 1 is a diagram of an example gas turbine engine 100. The example gas turbine engine 100 is contained within a housing 110. The gas turbine engine 100 includes an inlet 120, a compressor 160, a combustion chamber assembly 130, a turbine 140, and an exhaust 150. The inlet 120 allows fresh air to enter the gas turbine engine 100. After entering the inlet 120, the fresh air is transmitted through the compressor 160. The compressor 160 compresses the air with a series of rotating rotor blades. The compressed air is mixed with fuel (e.g., natural gas and/or other) and combusted within the combustion chamber assembly 130. The combusted air is then transmitted through the turbine 140, rotating the rotor blades of turbine 140. The turbine 140 is rotationally coupled to the compressor 160, and thus rotating the turbine 140 also rotates the compressor 160. After passing through the turbine 140, the combusted air exits the engine 100 through exhaust 150.

Figure 2:
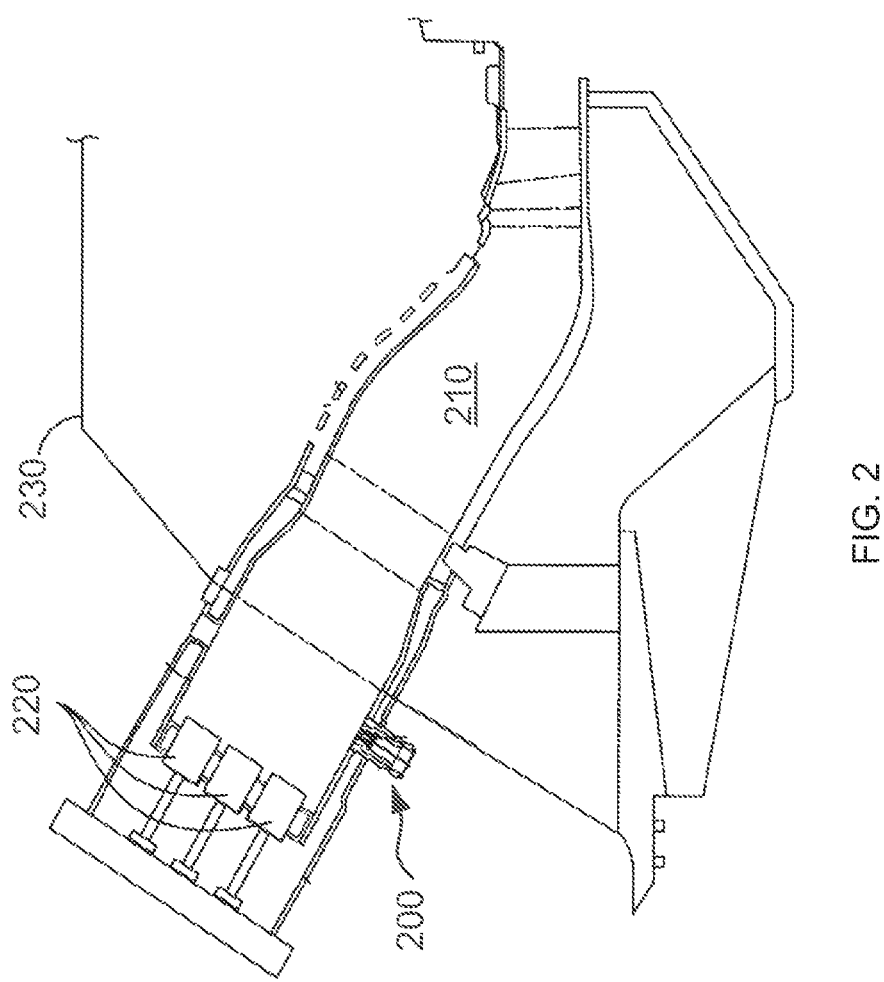
FIG. 2 is a detail, half cross-section view of an example combustion chamber system of the gas turbine engine of FIG. 1.

FIG. 2 is a detail view of the combustion chamber assembly 130 shown in FIG. 1. The combustion chamber assembly 130 includes an igniter 200, a combustion chamber 210, and fuel injectors 220. The combustion chamber assembly 130 is coupled to the housing 230 of the gas turbine engine. The fuel injectors 220 supply fuel into the combustion chamber 210. In the combustion chamber 210, the fuel mixes with fresh air. The fuel/air mixture in the combustion chamber 210 is then ignited by igniter 200.

FIGS. 3A-3E are detail views of implementations of an example igniter 300. The example igniter 300 could be used in a gas turbine engine such as the example engine 100 shown in FIG. 1. The example igniter 300 is at the wall of or protrudes into the combustion chamber 210, and can ignite a fuel/air mixture within the combustion chamber 210. The igniter event that ignites the fuel/air mixture occurs at a specified ignition location 320 on the igniter 300. FIGS. 3A-3E show a spark-gap igniter 300 that produces a spark type igniter event. The spark-gap igniter 300 has an ignition location 320 at the face of the igniter, in the air gap between ends of electrodes 322, 324. The igniter 300, however, can take a number of different forms, including a hot surface igniter, a laser igniter, a retractable igniter, or another type of igniter.

The igniter 300 includes an igniter event conductor 330 coupled to a remote sensor 340. The conductor 330 communicates some aspect of the igniter event in the combustion chamber 210 from near the ignition location 320 to the sensor 340, so that the aspect can be sensed by the sensor 340. The sensor 340 can then be used to determine that an igniter event has occurred, a characteristic of the igniter event (e.g., magnitude of the event), and that the event has occurred at the ignition location 320 and not somewhere else.

As described in more detail below, the conductor 330 can take many different forms. Generally, though, the conductor 330 has a first end or portion 350 located at or near the ignition location 320, in or out of the combustion chamber 210, and another end or portion coupled to the sensor 340.

The sensor 340 is apart from the ignition location 320 and outside of the combustion chamber 210. For example, the sensor 340 can be located in the body of the igniter 300, and in certain instances, at an end of the igniter 300 away from the combustion chamber 210. The sensor 340 could be alternatively located outside of the igniter 300, for example in an enclosure remote from the combustion chamber 210 and igniter 300, and/or at another location. The conductor 330 spans the distance between the combustion chamber 210 and the sensor 340. Locating the sensor 340 away from the combustion chamber 210 can protect the sensor 340 from damage or wear due to heat and combustion by-products in the combustion chamber 210. The conductor 300 and sensor 340 can be sealed so that the ignition system remains hermetic.

In certain implementations, the conductor 330 is a pressure conductive path that communicates pressure from within combustion chamber 210 to the sensor 340 and the sensor 340 is an acoustic sensor (e.g., measuring in dB or other measure of sound) or a pressure sensor (e.g., for measuring in MPa or other measure of pressure). For example, the sensor 340 can be a piezoelectric sensor, a pressure transducer, or other type of sensor. A sound or a change in combustion chamber 210 pressure can indicate a successful igniter event. For example, a strong spark between electrodes 322, 324 of a spark-gap igniter 300 will produce an acoustic signature from the location of the spark gap that is different from the sound of a weak spark between electrodes 322, 324, a spark that shorts to another conductive component in the combustion chamber 210 or no spark at all. Similarly, a spark and/or initial igniter event at the ignition location 320 can create a pressure shockwave that emanates from the ignition location 320. As above, a strong spark between electrodes 322, 324 will produces a pressure signature from the location of the spark gap that is different from the pressure signature of a weak spark, a spark that shorts to another component or no spark at all. The conductor 330 can communicate the acoustic signature and/or change in pressure within the combustion chamber 210 to the sensor 340. In certain instances, the conductor 330 can be a hollow tube with one end 350 open to the combustion chamber 210 and the opposite end coupled to the sensor 340. In another example, the conductor 330 can be solid and made from a highly acoustically conductive material.

As discussed in more detail below, for each of the implementations described herein, the end of the conductor 330 in the combustion chamber 210 can be in a specified location and/or with a specified orientation to facilitate distinguishing igniter events at the ignition location 320 from igniter events at other locations in the combustion chamber 210. Therefore, the sensor 340 is able to distinguish both that the igniter 300 has functioned in creating a successful igniter event (e.g., has created a spark of a specified strength or greater) and that the igniter event has occurred at the ignition location 320.

In certain implementations, the conductor 330 is a light conductive path that communicates light within combustion chamber 210 to the sensor 340 and the sensor is an optical sensor. For example, the sensor 340 can be an optical sensor that detects light or light intensity, such as a photodetector and/or other sensor. An increase in light intensity within the combustion chamber 210 can indicate a successful igniter event, for example, as the spark or initial flame kernel emits light. The intensity and color of the light can indicate the strength of the igniter event. In some cases, the conductor 330 can be an optical fiber or fiberglass tube that communicates light from within the combustion chamber 210 to the sensor 340.

In certain implementations, the conductor 330 is an electrically conductive path that communicates an electrical signal from the combustion chamber 210 to the sensor 340 and the sensor 340 is an electrical sensor, such as a voltage sensor, a current sensor, and/or other electrical sensor. An electrical signature can indicate a successful igniter event. In some cases, the conductor 330 can be a metal element (e.g., a wire) or one or more electrodes and conduct the electrical signal to the sensor 340. For example, a voltage sensor or current sensor can detect an electrical interference signal. A current sensor can also detect the presence of ions from the formation of plasma in the combustion chamber 340.

Figure 3A:
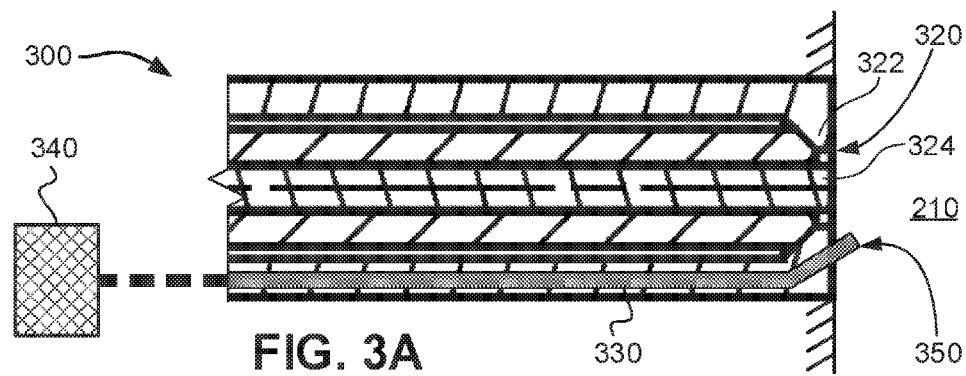
FIG. 3A is a detail, half cross-sectional view of an example igniter for a gas turbine engine.

In FIG. 3A, a portion of the conductor 330 is located within the igniter 300. The conductor 330 has an end 350 that extends into the combustion chamber 210. The opposing end of the conductor 330 is coupled to the sensor 340. The sensor 340 is located apart from the ignition location 320, outside of the combustion chamber 210. The end 350 of the conductor 330 is in a specified location adjacent to and at specified orientation toward the ignition location 320. The specified location and orientation are selected so the conductor 330 more efficiently conducts igniter events at the ignition location 320 than igniter events at other locations in the combustion chamber 210. As such, the conductor 330 and sensor 340 can distinguish igniter events that occur at the ignition location 320 from igniter events that occur elsewhere in the combustion chamber 210 or elsewhere on the igniter 300. In certain instances, the specified location can be inside or outside a region of spark or plasma generation.

Figure 3B:
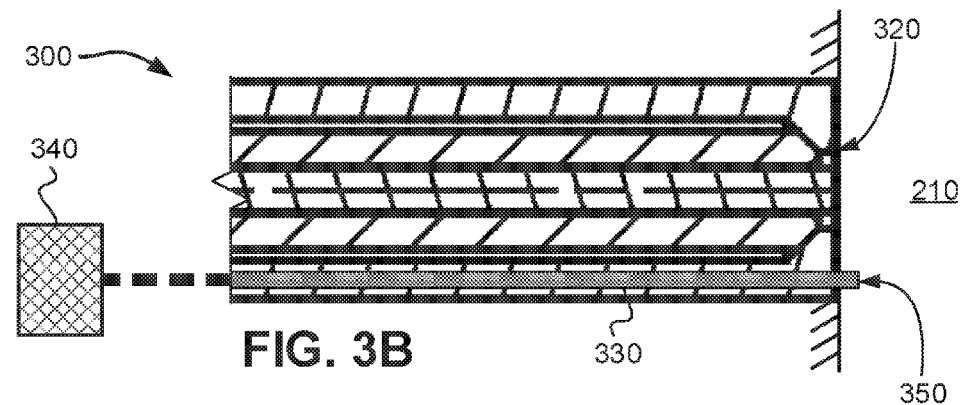
FIG. 3B is a detail, half cross-sectional view of another example igniter for a gas turbine engine.

FIG. 3B shows another example that is the same as that of FIG. 3A, except that the end 350 of the conductor 330 is not angled toward the ignition location 320. The specified location of the end 350 can still be selected so the conductor 330 more efficiently conducts and the sensor 340 can distinguish igniter events at the ignition location 320 than igniter events at other locations in the combustion chamber 210 and in the igniter 330.

Figure 3C:
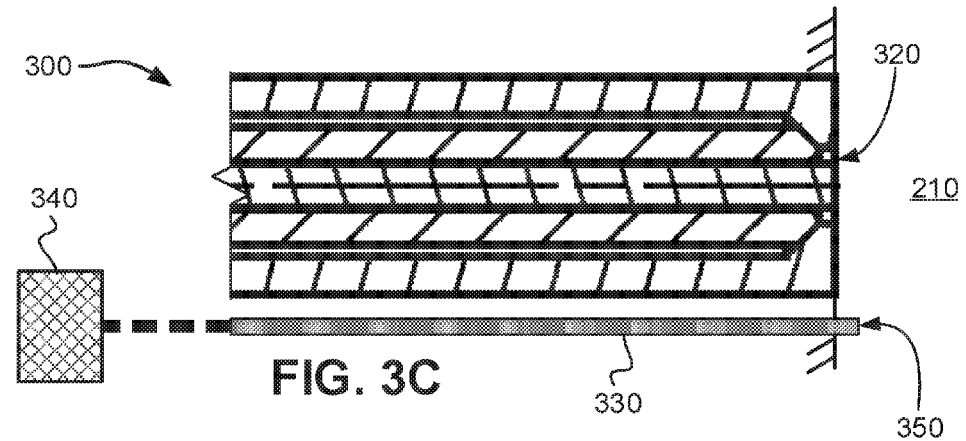
FIG. 3C is a detail, half cross-sectional view of another example igniter for a gas turbine engine.

FIG. 3C shows another example that is the same as that of FIG. 3B, except that the conductor 330 resides outside of the igniter 300. In FIG. 3C, the conductor 330 resides elsewhere, for example, in a head or sidewall of the combustion chamber 210. In certain instances, a portion of the conductor 330 can reside in the igniter 300, while another portion resides outside of the conductor 330.

Figure 3D:
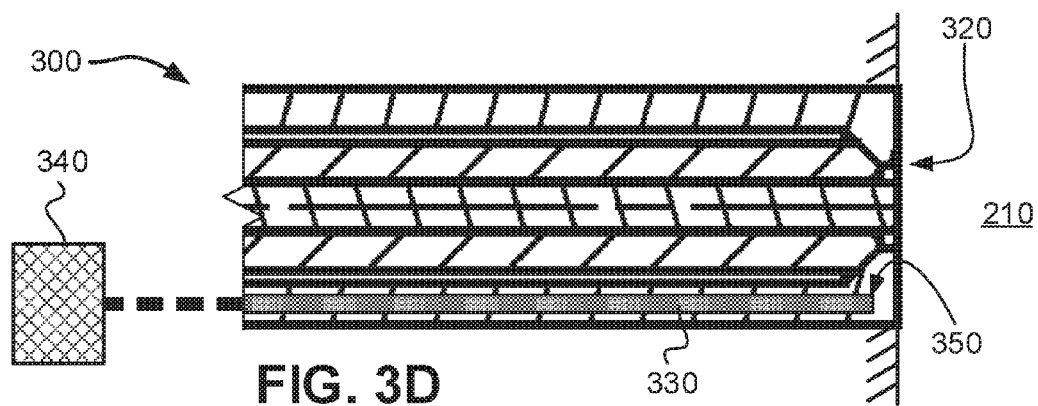
FIG. 3D is a detail, half cross-section view of another example igniter for a gas turbine engine.

FIG. 3D shows another example that is the same as that of FIG. 3B, except that the end 350 of the conductor 330 is located outside of the combustion chamber 210. Here, the end 350 is shown within the igniter 300, but it could be elsewhere. In the configuration of FIG. 3D, the end 350 of the conductor 330 is not directly exposed to combustion or combustion byproducts the combustion chamber 210.

Figure 3E:
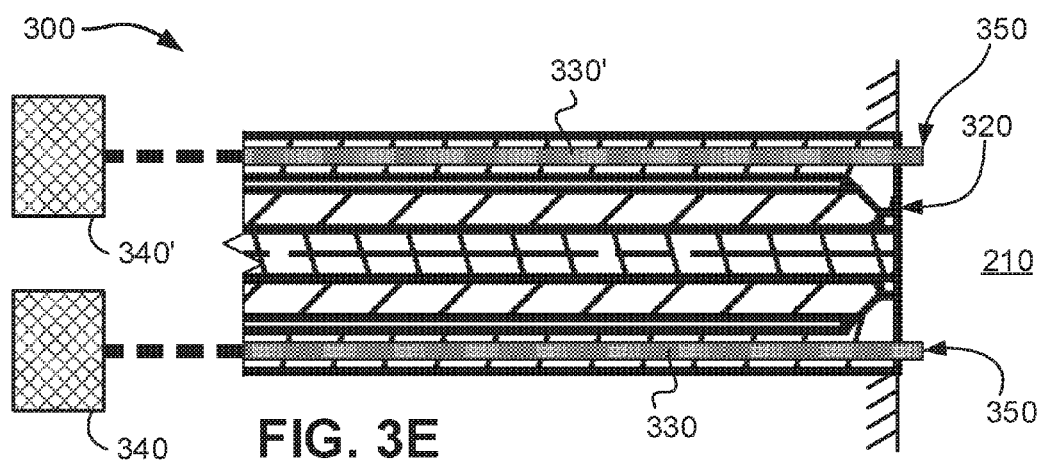
FIG. 3E is a detail, half cross-sectional view of an example igniter for a gas turbine engine.

FIG. 3E shows another example that is the same as that of FIG. 3B, except that two conductors, conductor 330 and conductor 330', are provided. In FIG. 3E, the each of the conductors 330, 330' is coupled to its own sensor 340, 340'. In other instances, more than two conductors 330 and two sensors 340 could be used. Also, although the example shows the same conductor configuration as FIG. 3B, any of the configurations of FIGS. 3A-3D could be provided with multiple conductors 330 and multiple sensors 340. Furthermore, with multiple conductors 330 and multiple sensors 340, the conductors 330 and the sensors 340 can be all of the same type or some or all of the conductor 330 and sensor 340 sets can be different than others. In some cases, a single conductor can be coupled to two or more sensors.

Referring back to FIG. 3A, in any of the embodiments herein, the sensor 340 can be part of a sensor system 340 having the sensor and a controller. The sensor system 340 can use the sensor and determine if a successful igniter event has occurred based on the data received from the sensor and a specified threshold value for that data. For example, if sensor is a pressure sensor, a pressure change greater than a threshold pressure change value can indicate a successful igniter event. In the context of an electrical sensor, the threshold value is a specified voltage or a specified current. In the context of an acoustic sensor, the threshold is an acoustic signal of a specified magnitude. In the context of an optical sensor, the threshold is an optical signal of a specified magnitude. Also, in a system that has multiple igniters 300, the sensor system 340 can be coupled to monitor the multiple igniters 300.

Based on the sensor data and the threshold value, the controller can determine if a successful igniter event has occurred. The controller can also log if a successful igniter event has or has not occurred. After a specified number of successful or unsuccessful igniter events, the controller can send a misfire signal. For example, the controller can sound an alarm or signal a message on a display. This enables misfires to be detected without needing to remove and test the igniter or other associated part. In systems having multiple igniters 300, the controller can indicate which of the multiple igniters 300 has logged the specified number of unsuccessful ignition attempts.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A system for a gas turbine engine, the system comprising:
   an igniter event conductor comprising a first portion adjacent an ignition location of an igniter of the engine and in a combustion chamber of the engine and a second portion apart from the igniter and outside the combustion chamber, the conductor extending through a portion of the igniter and adapted to conduct a portion of an igniter event at the igniter along a continuous flowpath from the first portion of the conductor to the second portion of the conductor;
   a sensor coupled to, and residing proximate, the second portion of the conductor to receive and sense the portion of the igniter event; and
   a second igniter event conductor coupled to a second sensor, wherein the first mentioned sensor and the second sensor are different types of sensors.

2. The system of claim 1, wherein the sensor comprises at least one of an optical sensor, an acoustic sensor, a current sensor, a voltage sensor, or a pressure sensor.

3. The system of claim 1, wherein the first portion of the conductor is angled toward the ignition location of the igniter.

4. The system of claim 1, wherein the first portion of the conductor is adjacent to the ignition location of the igniter.

5. The system of claim 1, wherein the conductor comprises a fiber optic and the sensor comprises an optical sensor.

6. The system of claim 1, wherein the conductor comprises an electrically conductive path and the sensor comprises at least one of an electrical current sensor or a voltage sensor.

7. The system of claim 1, wherein the conductor comprises a pressure conductive path and the sensor comprises at least one of an acoustic sensor or a pressure sensor.

8. The system of claim 1, comprising a controller communicatively coupled to the sensor and configured to determine that an igniter event occurred at the ignition location based on an input from the sensor and a threshold value.

9. The system of claim 8, wherein the threshold value is a specified voltage, a specified current, an acoustic signal of a specified magnitude, a pressure signal of a specified magnitude, or an optical signal of a specified magnitude.

10. A method comprising:
    communicating, along a continuous flowpath of an igniter event conductor, a portion of an igniter event received adjacent an ignition location of an igniter within a combustion chamber of a gas turbine engine to a sensor outside of the combustion chamber, the sensor coupled to, and residing proximate, a portion of the event conductor, the conductor extending through a portion of the igniter;
    sensing the portion of the igniter event at the sensor; and
    communicating, along a second flowpath of a second event conductor, a second portion of an igniter event to a second sensor, wherein the first mentioned sensor and the second sensor are different types of sensors.

11. The method of claim 10, comprising determining that an igniter event has occurred based on sensing the portion of the igniter event and a threshold value.

12. A system for a gas turbine engine, the system comprising:
    a sensor that senses a portion of an igniter event;
    an igniter event conductor coupled to the sensor that conducts the portion of the igniter event to the sensor along a continuous flowpath, the conductor comprising a first portion adjacent an ignition location of an igniter of the engine and in a combustion chamber of the engine and a second portion apart from the igniter and outside the combustion chamber, the conductor extending through a portion of the igniter;
    a controller coupled to the sensor that determines that an igniter event occurred at the igniter based on an input from the sensor and a threshold value; and
    a second conductor coupled to a second sensor, wherein the first mentioned sensor and the second sensor are a different type.

13. The system of claim 12, wherein the sensor comprises at least one of an optical sensor, an acoustic sensor, a current sensor, a voltage sensor, or a pressure sensor.

14. The system of claim 12, wherein the conductor comprises a fiber optic and the sensor comprises an optical sensor.

15. The system of claim 12, wherein the conductor comprises an electrically conductive path and the sensor comprises at least one of an electrical current sensor or a voltage sensor.

16. The system of claim 12, wherein the conductor comprises a pressure conductive path and the sensor comprises at least one of an acoustic sensor or a pressure sensor.

17. The system of claim 12, wherein the threshold value is a specified voltage, a specified current, an acoustic signal of a specified magnitude, a pressure signal of a specified magnitude, or an optical signal of a specified magnitude.

18. A system for a gas turbine engine, the system comprising:
    an igniter event conductor comprising a first portion adjacent an ignition location of an igniter of the engine and in a combustion chamber of the engine and a second portion apart from the igniter and outside the combustion chamber, the conductor adapted to conduct a portion of an igniter event at the igniter along a continuous pressure conductive flowpath from the first portion of the conductor to the second portion of the conductor;
    a sensor coupled to, and residing proximate, the second portion of the conductor to receive and sense the portion of the igniter event, the sensor comprising at least one of an acoustic sensor or a pressure sensor; and
    a second conductor coupled to a second sensor, wherein the first mentioned sensor and the second sensor are a different type.

19. A system for a gas turbine engine, the system comprising:
    a first sensor that senses a portion of an igniter event;
    a first igniter event conductor coupled to the first sensor that conducts the portion of the igniter event to the first sensor along a continuous flowpath, the first conductor comprising a first portion adjacent an ignition location of an igniter of the engine and in a combustion chamber of the engine and a second portion apart from the igniter and outside the combustion chamber;

a second igniter event conductor coupled to a second sensor that senses a portion of the igniter event, where the first sensor and the second sensor are of a different type; and a controller coupled to at least one of the first sensor or the second sensor that determines that an igniter event occurred at the igniter based on an input from the at least one first or second sensor and a threshold value.

\* \* \* \* \*